(12) United States Patent
Chen et al.

(10) Patent No.: US 11,687,467 B2
(45) Date of Patent: Jun. 27, 2023

(54) DATA SHARING SYSTEM AND DATA SHARING METHOD THEREFOR

(71) Applicant: Shanghai Cambricon Information Technology Co., Ltd, Pudong New Area (CN)

(72) Inventors: Tianshi Chen, Pudong New Area (CN); Shuai Hu, Pudong New Area (CN); Yifan Hao, Pudong New Area (CN); Yufeng Gao, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 665 days.

(21) Appl. No.: 16/694,056

(22) Filed: Nov. 25, 2019

(65) Prior Publication Data

US 2020/0089623 A1    Mar. 19, 2020

Related U.S. Application Data

(63) Continuation of application No. 16/693,918, filed on Nov. 25, 2019, now Pat. No. 10,901,815, which is a
(Continued)

(30) Foreign Application Priority Data

Apr. 28, 2018  (CN) .......................... 201810407185.6

(51) Int. Cl.
*G06F 3/06*       (2006.01)
*G06F 12/1081*    (2016.01)
(Continued)

(52) U.S. Cl.
CPC ........ *G06F 12/1081* (2013.01); *G06F 3/0604* (2013.01); *G06F 3/0655* (2013.01);
(Continued)

(58) Field of Classification Search
None
See application file for complete search history.

(56) References Cited

U.S. PATENT DOCUMENTS

| 8,635,412 B1 | 1/2014 | Wilshire |
| 2007/0226718 A1 | 9/2007 | Watanabe |

(Continued)

FOREIGN PATENT DOCUMENTS

| CN | 1200513 A | 12/1998 |
| CN | 1522402 A | 8/2004 |

(Continued)

OTHER PUBLICATIONS

CN201710515517.8—Office Action, dated Feb. 23, 2022, 23 pages, (with English translation).
(Continued)

*Primary Examiner* — Scott C Sun
(74) *Attorney, Agent, or Firm* — Getech Law LLC; Jun Ye

(57) ABSTRACT

The disclosure provides an information processing device and method. The information processing device includes a storage module a storage module configured to acquire information data, wherein the information data including at least one key feature and the storage module pre-storing true confidence corresponding to the key feature; an operational circuit configured to determine predicted confidence corresponding to the key feature according to the information data and judge whether the predicted confidence of the key feature exceeds a preset threshold value range of the true confidence corresponding to the key feature or not; a controlling circuit configured to control the storage module to modify the key feature or send out a modification signal to the outside when the predicted confidence exceeds the preset threshold value of the true confidence. The information processing device of the disclosure can automatically correct
(Continued)

and modify handwriting, text, image or video actions instead of artificial method.

12 Claims, 3 Drawing Sheets

Related U.S. Application Data continuation-in-part of application No. PCT/CN2018/092829, filed on Jun. 26, 2018.

(51) Int. Cl.
*G06N 3/08* (2023.01)
*G06N 3/063* (2023.01)
*G06N 3/02* (2006.01)

(52) U.S. Cl.
CPC ............. *G06F 3/0673* (2013.01); *G06N 3/02* (2013.01); *G06N 3/063* (2013.01); *G06N 3/08* (2013.01); *G06F 2212/621* (2013.01)

(56) References Cited

U.S. PATENT DOCUMENTS

| | | | |
|---|---|---|---|
| 2009/0265500 | A1 | 10/2009 | Kyusojin |
| 2012/0131283 | A1 | 5/2012 | Mital et al. |
| 2016/0103743 | A1 | 4/2016 | Sanghi et al. |
| 2016/0179434 | A1 | 6/2016 | Herrero Abellanas et al. |
| 2016/0217198 | A1 | 7/2016 | Lee et al. |
| 2017/0169812 | A1 | 6/2017 | Lample et al. |
| 2017/0228584 | A1* | 8/2017 | Studnicka ............... G06Q 20/10 |
| 2019/0294413 | A1* | 9/2019 | Vantrease ............... G06N 3/063 |

FOREIGN PATENT DOCUMENTS

| | | |
|---|---|---|
| CN | 1588425 A | 3/2005 |
| CN | 1702858 A | 11/2005 |
| CN | 101739867 A | 6/2010 |
| CN | 101980149 A | 2/2011 |
| CN | 102184157 A | 9/2011 |
| CN | 102741828 A | 10/2012 |
| CN | 102831011 A | 12/2012 |
| CN | 102866912 A | 1/2013 |
| CN | 102930866 A | 2/2013 |
| CN | 103019656 A | 4/2013 |
| CN | 103177733 A | 6/2013 |
| CN | 103347037 A | 10/2013 |
| CN | 103530600 A | 1/2014 |
| CN | 103928023 A | 7/2014 |
| CN | 104021042 A | 9/2014 |
| CN | 104268603 A | 1/2015 |
| CN | 104281540 A | 1/2015 |
| CN | 104463101 A | 3/2015 |
| CN | 104464423 A | 3/2015 |
| CN | 104978971 A | 10/2015 |
| CN | 105159762 A | 12/2015 |
| CN | 105512723 A | 4/2016 |
| CN | 105678253 A | 6/2016 |
| CN | 105793830 A | 7/2016 |
| CN | 106056212 A | 10/2016 |
| CN | 106062786 A | 10/2016 |
| CN | 106407145 A | 2/2017 |
| CN | 106502806 A | 3/2017 |
| CN | 106682702 A | 5/2017 |
| CN | 106781784 A | 5/2017 |
| CN | 106897248 A | 6/2017 |
| CN | 106909971 A | 6/2017 |
| CN | 107590531 A | 1/2018 |
| CN | 107832768 A | 3/2018 |
| CN | 107992329 A | 5/2018 |
| WO | 2015042904 A1 | 4/2015 |

OTHER PUBLICATIONS

CN201810467383.1—Office Action, dated Aug. 27, 2021, 21 pages, (with English translation).
CN201810641721.9—Office Action, dated Oct. 9, 2021, 13 pages, (with English translation).
Goodfellow et al., "Generative Adversarial Nets", Jun. 10, 2014, 9 pages.
EP18824582.3, Response to Extended European Search Report dated Aug. 20, 2020, dated Feb. 18, 2021, 13 pages.
EP18824582.3, Response to the Invitation to File Search Results Pursuant to Rule 70b(1) EPC dated Mar. 1, 2021, filed Mar. 4, 2021, 16 pages.
CN201810407185.6, Office Action, dated May 2, 2021, 10 pages. (No English Translation).
CN201710515517.8—Office Action dated Jul. 31, 2020, 13 pages. (No English Translation).
Li Hong, The application of BP Neural Network in Image Correcting Work Based on Matlab Platform, Journal of Langfang Teachers College (Natural Science Edition), vol. 15 No. 1, Feb. 2015, 4 pages.
CN201710497394.X—Office Action, dated May 8, 2020, 11 pages (No English Translation).
CN201710497394.X—Second Office Action, dated Dec. 18, 2020, 8 pages (No English Translation).
Yu Zijian, et al., "FPGA-Based Accelerator for Convolutional Neural Network", Computer Engineering, 2017, 7 pages.
Shijin Zhang, et. al., "Cambricon-X: An Accelerator for Sparse Neural Networks", IEEE, 2016, 12 pages.
Shaoli Liu, et al., "Cambricon: An Instruction Set Architecture for Neural Networks", ACM/IEEE, 2016, 13 pages.
CN201710721049.X, Office Action, dated Apr. 23, 2020, 12 pages. (No English Translation).
CN201710721049.X, Second Office Action, dated Nov. 24, 2020, 8 pages. (No English Translation).
CN201810407185.6, Office Action, dated May 27, 2020, 11 pages. (No English Translation).
Shun-Wen Cheng, "Configurable CMOS H-tree Logic Module", Dept. of Electronic Engineering, Far East University, IEEE, 2009, 4 pages.
PCT/CN2018092829, EP18824582.3, Extended European Search Report, dated Aug. 3, 2020, 9 pages.
PCT/CN2018092829, Search Report, dated Sep. 17, 2018, 10 pages. (No English Translation).
CN 201710515517.8—Notification to Grant Patent Right for Invention, dated Nov. 1, 2022, 5 pages.
EP18824582.3—Communication pursuant to Article 94(3) EPC dated Feb. 28, 2023, 7 pages.

\* cited by examiner

US 11,687,467 B2

DATA SHARING SYSTEM AND DATA SHARING METHOD THEREFOR

TECHNICAL FIELD

The disclosure relates to the field of information processing, and particularly to an information processing device and method.

BACKGROUND

With the advent of the era of big data, neural network algorithm has become a research hotspot in the field of artificial intelligence in recent years, and has been widely applied in pattern recognition, image analysis, intelligent robot and other aspects.

The existing technology basically adopts artificial method, such as artificial correcting, checking twice of video or image, to correct homework or test paper, correct actions or expressions of sports, correct steps for intellectual projects.

However, the above-mentioned method has strong subjectivity, and is low precision, time-consuming, which may delay the valuable time of teachers or coaches.

SUMMARY

The disclosure provides an information processing device, method and equipment, so as to solve the above technical problems.

According to an aspect of the disclosure, an information processing device is provided. The information processing device may include a storage module configured to acquire information data that includes at least one key feature, and store at least one true confidence corresponding to the at least one key feature; an operational circuit configured to determine a predicted confidence corresponding to the key feature according to the acquired information data and determine whether the predicted confidence of the key feature exceeds a preset threshold value range of the true confidence corresponding to the key feature; and a controlling circuit configured to control the storage module to modify the key feature based on a determination that the predicted confidence exceeds the preset threshold value of the true confidence.

In some embodiments, the storage module includes a DMA (Direct Memory Access) electrically connected with the operational circuit and configured to store the predicted confidence determined by operation of the operational circuit, and send the true confidence and the predicted confidence into the operational circuit for comparison. the storage module further may include a storage unit configured to acquire the information data from the outside of the information processing device, and transmit it into the DMA for the operational circuit to call.

In some embodiments, the storage module may be further configured to store a neural network dedicated instruction, input neurons, output neurons, and weights in a neural network. The information processing device may further include an instruction cache configured to cache the dedicated instruction from the storage module for the controlling circuit to call, an input neuron cache configured to cache the neurons from the storage module for the operational circuit to call, a weight cache configured to cache the weights from the storage module for the operational circuit to call, and an output neuron cache configured to store the output neurons obtained by the operation of the operational circuit.

In some embodiments, the operational circuit may be further configured to score the information data according to a judgment result of each key feature.

In some embodiments, the operational circuit may be further configured to input the information data to the neural network, and identify output of the neural network as the predicted confidence.

In some embodiments, the information processing device may further include a preprocessing module configured to perform one or more preprocessing operations external original information data and transmit into the storage module, wherein the preprocessing operations include original information data segmenting, Gaussian filtering, binarizing, regularizing and/or normalizing to obtained data consistent with an input format of the neural network.

The disclosure may further include an information processing equipment. The information processing equipment may include an information acquisition device configured to acquire external information data; the information processing device of claim 1 configured to process the information data, obtain the predicted confidence of a key feature, and modify the key feature or send out a modification signal when the predicted confidence exceeds a preset threshold value of true confidence; and an interaction interface configured to receive the modified key feature or the modification signal and display a modified content to a user.

In some embodiments, the information acquisition device may further include a preprocessing module configured to preprocess the information data acquired by the information acquisition device and send it to the information processing device. The information processing equipment may further include a controller configured to control the information acquisition device, the information processing device, and/or the interaction interface. The interaction interface may be further configured to modify the preset threshold value in response to an operation or command of the user.

The disclosure may further include an information processing method. The method may include acquiring an information data through a storage module, wherein the information data comprises at least one key feature; storing, by the storage module, at least one true confidence corresponding to the at least one key feature; determining, by an operational circuit, a predicted confidence corresponding to one of the at least one key feature according to the information data; determining whether the predicted confidence of the key feature exceeds a preset threshold value range of the true confidence corresponding to the key feature; and controlling, by a controlling circuit, the storage module to modify the key feature based on a determination that the predicted confidence exceeds the preset threshold value range of the true confidence.

The method may further include storing, by a DMA, the predicted confidence determined by the operational circuit; sending, by the DMA, the true confidence and the predicted confidence into the operational circuit for comparison; acquiring, by a storage unit, the information data from an external device; and transmitting the information data into the DMA for the operational circuit to call.

The method may further include storing, by the storage module, a neural network dedicated instruction, caching the neural network dedicated instruction in an instruction cache from the storage module for the controlling circuit to call, storing, by the storage module, input neurons, output neurons and weights in a neural network, caching, by an input neuron cache, the neurons from the storage module for the operational circuit to call, caching, by a weight cache, the weights from the storage module for the operational circuit to call, and storing, by an output neuron cache, the output neurons obtained by an operation of the operational circuit.

The method may further include adopting the operational circuit to score the information data according to a judgment result of each key feature.

The method may further include performing an adaptive training on the neural network through the operational circuit.

In some embodiments, the method may further include performing neural network operations by inputting the information data to the neural network, and identifying output of the neural network as the predicted confidence.

The method may further include preprocessing external original information data through a preprocessing module and then transmitting the information data into the storage module.

In a further implementation solution, the storage module may include a DMA, and the DMA may be electrically connected with the operational circuit, and may be configured to store the predicted confidence determined by operation of the operational circuit and send the true confidence and the predicted confidence into the operational circuit for comparison.

In a further implementation solution, the storage module may further include a storage unit, and the storage unit may be configured to acquire the information data from the outside of the information processing device and transmit it into the DMA for the operational circuit to call.

In a further implementation solution, the storage module may be further configured to store a neural network dedicated instruction and input neurons, output neurons and weights in a neural network. The information processing device may further include the follows: an instruction cache, an input neuron cache, a weight cache, and an output neuron cache.

The instruction cache may be configured to cache the dedicated instruction from the storage module for the controlling circuit to call. The input neuron cache may be configured to cache the neurons from the storage module for the operational circuit to call. The weight cache may be configured to cache the weights from the storage module for the operational circuit to call. The output neuron cache may be configured to store the output neurons obtained by the operation of the operational circuit.

In a further implementation solution, the operational circuit may be further configured to score the information data according to a judgment result of each key feature, or the operational circuit may be further configured to perform adaptive training on the neural network.

In a further implementation solution, determining the predicted confidence corresponding to the key feature according to the information data in the operational circuit may include: performing neural network operation by taking the information data as input of the neural network, in which the predicted confidence may be taken as output of the neural network.

In a further implementation solution, the information data may include at least one of a picture, a text, an audio, a video frame and a video.

In a further implementation solution, a preprocessing module may be further included, and may be configured to preprocess external original information data and then transmit into the storage module. Preferably, preprocessing may include original information data segmenting, Gaussian filtering, binarizing, regularizing and/or normalizing to obtained data consistent with an input format of the neural network.

According to another aspect of the disclosure, information processing equipment is provided, which may include an information acquisition device configured to acquire external information data. The information processing equipment may be configured to process the information data, obtain predicted confidence of a key feature and, when the predicted confidence exceeds a preset threshold value of true confidence, modify the key feature or send out a modification signal.

According to another aspect of the disclosure, information processing equipment is provided, which may include an information acquisition device configured to acquire external information data. The information processing equipment may be configured to process the information data, obtain predicted confidence of a key feature and, when the predicted confidence exceeds a preset threshold value of true confidence, modify the key feature or send out a modification signal. An interaction interface may be also included, which may be configured to receive the modified key feature or the modification signal and display a modified content to a user.

In a further implementation solution, the information acquisition device may further include a preprocessing module configured to preprocess the information data acquired by the information acquisition device and send it to the information processing device.

In a further implementation solution, a controller may be further included, and may be configured to control the information acquisition device, the information processing device and/or the interaction interface.

In a further implementation solution, the interaction interface may be further configured to modify the preset threshold value in response to an operation or command of the user.

According to another aspect of the disclosure, an information processing method is provided, which may include: acquiring information data through a storage module, in which the information data may include at least one key feature and the storage module may pre-store true confidence corresponding to the key feature; an operational circuit determining predicted confidence corresponding to the key feature according to the information data and judges whether the predicted confidence of the key feature exceeds a preset threshold value range of the true confidence corresponding to the key feature or not; a controlling circuit controlling the storage module to modify the key feature or sending out a modification signal when the predicted confidence exceeds the preset threshold value range of the true confidence.

In a further implementation solution, the storage module may include a DMA, and the method may further include: adopting the DMA to store the predicted confidence determined by the operational circuit and sending the true confidence and the predicted confidence into the operational circuit for comparison.

In a further implementation solution, acquiring the information data through the storage module may include: adopting a storage unit to acquire the information data from the outside and transmitting it into the DMA for the operational circuit to call.

In a further implementation solution, the steps may further include: adopting the storage module to store a neural network dedicated instruction and caching the neural network dedicated instruction in an instruction cache from the storage module for the controlling circuit to call; adopting the storage module to store input neurons, output neurons and weights in a neural network; adopting an input neuron cache to cache the neurons from the storage module for the operational circuit to call; adopting a weight cache to cache the weights from the storage module for the operational circuit to call, and adopting an output neuron cache to store the output neurons obtained by an operation of the operational circuit.

In a further implementation solution, the steps may further include: adopting the operational circuit to score the information data according to a judgment result of each key feature, or performing an adaptive training on the neural network through the operational circuit.

In a further implementation solution, the operational circuit determining predicted confidence corresponding to the key feature according to the information data may include: performing neural network operation by taking the information data as input of the neural network, in which the predicted confidence may be taken as output of the neural network.

In a further implementation solution, the steps may further include: preprocessing external original information data through a preprocessing module for transmission into the storage module.

The information processing device, method and equipment provided by the application at least have the following advantages.

1. The information processing device may automatically score a handwriting, a text and a picture instead of a worker, which is more accurate and faster than manual scoring. A subjective question may be evaluated more objectively, and influence of hobbies of a person and influence of a handwriting level of a testee are avoided, therefore the modification effect is greatly improved.

2. By the information acquisition device, the movements/postures of the user may be monitored instantly, a prompt is automatically and instantly given to regulate the movements/postures of the user, and the method and the device work for training and monitoring instead of the worker, and are more accurate and instant than the worker.

3. The application supports offline running of the neural network and may work for automatic scoring monitoring without assistance of a cloud server in calculation when a user terminal/front end is offline.

4. The information processing device may perform adaptive training, and the artificial neural network chip accumulates data of a user for self-learning and may be gradually adapted to, for example, handwritings, habitual writing errors, postural characteristics and habitual movements of the user to constantly improve the accuracy and improve a movement/posture regulation capability for the user.

5. The information processing device may adopt dedicated on-chip caches (for example, the instruction cache, the input neuron cache, an output neuron cache and the weight cache) and a dedicated artificial neural network operational instruction and a memory access instruction are adopted, so that computational and memory access efficiency may be effectively improved.

6. According to the information processing device, multiple groups of weights and input neurons may be concurrently processed by the adder tree computation adopted by the computation module, so that the computational efficiency can be improved.

7. The information processing device may include a preprocessing module, so that the input data is more suitable to be processed by an artificial neural network to remove noise and redundancy in the input data and improve classification and recognition accuracy and the like.

DETAILED DESCRIPTION OF THE EMBODIMENTS

In order to make the purpose, technical solutions and advantages of the disclosure clearer, the disclosure will further be described below in combination with specific embodiments and with reference to the drawings in detail.

Figure 1:
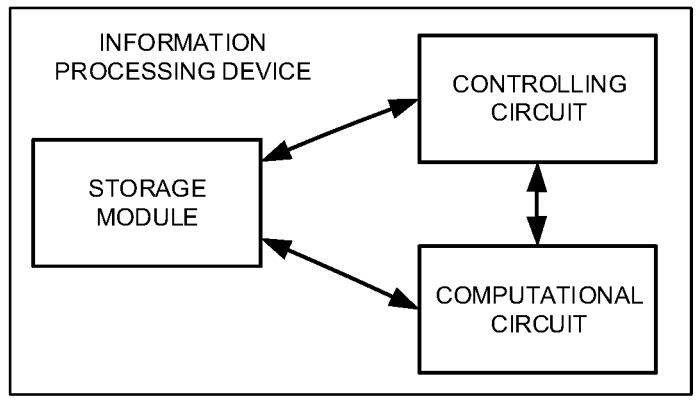
FIG. 1 is a block diagram of an information processing device according to an embodiment of the disclosure.

Referring to FIG. 1, an aspect of the embodiments of the disclosure provides an information processing device, which may include the follows. A storage module may be configured to acquire information data, the information data including at least one key feature and the storage module pre-storing true confidence corresponding to the key feature. A computational circuit may be configured to determine predicted confidence corresponding to the key feature according to the information data and judging whether the predicted confidence of the key feature exceeds a preset threshold value range of the true confidence corresponding to the key feature or not. A controlling circuit may be configured to control the storage module to modify the key feature or send out a modification signal to the outside if the predicted confidence exceeds the preset threshold value range of the true confidence. Through the information processing device, the information data may be automatically corrected and modified rather than manually, and the device is more accurate and faster than manual scoring.

Categories of the information data have been described above according to types, and function classes of the information data will be introduced below. Specifically, school work or test paper of a student, movement or expression data of a sports event or an operation manner or steps of a puzzle event may be involved. For example, the school work or the test paper may be an electronic text, a handwritten text and/or a figure, where the handwritten text and/or the figure may include a combination of one or more handwritten language texts and/or symbols, a handwritten two-dimensional diagram and a handwritten two-dimensional perspective. Furthermore, the combination of the one or more handwritten language texts and/or symbols is a handwritten answer test paper of a subject such as Chinese language, mathematics and physics. Furthermore, the handwritten two-dimensional diagram and/or two-dimensional perspective are/is a handwritten answer of test paper of a subject such as fine arts and cartography. For example, a movement or expression may be a shot picture and/or video. For example, the operation manner or steps of the puzzle event may be electronic data, picture or video reflecting the operation manner or steps. The information data of the abovementioned categories may be timely and automatically modified to improve efficiency of a coach or a teacher and enable a student to timely and accurately correct errors.

In the disclosure, the storage module may be configured to store data and an instruction, where the data may include input neurons (for example, preprocessed data), output neurons (for example, the predicted confidence corresponding to the key features), weights, a loss function, gradient and score in a neural network computation and output process and an error mode judgment result.

In the disclosure, the computational circuit may be configured to perform corresponding computation on the data according to the instruction stored in the storage module. The computational circuit may perform the computation in three steps. In the first step, the input neurons and weights data are multiplied. In a second step, adder tree computation may be performed to add a result obtained in the first step through an adder tree step by step to obtain a weighted sum, and the weighted sum may be offset or not processed according to a requirement. In a third step, activation function computation may be performed on a result obtained in the second step to obtain the output neurons. Values of the output neurons are the predicted confidence of the key features. An activation function may be a sigmoid function, a tan h function, a ReLU function, a softmax function or the like.

In the embodiment of the disclosure, the predicted confidence may be any natural number. For example, if a value of the confidence is larger, the confidence about inclusion of the key feature is higher. The confidence may also be normalized into a natural number within a certain range. For example, if the confidence is within [0, 1], the confidence represents a confidence probability about inclusion of the key feature.

In some embodiments, the storage module may include a DMA, and the DMA is electrically connected with the computational circuit, and may be configured to store the predicted confidence determined by computation of the computational circuit and send the true confidence and the predicted confidence into the computational circuit for comparison.

Figure 2:
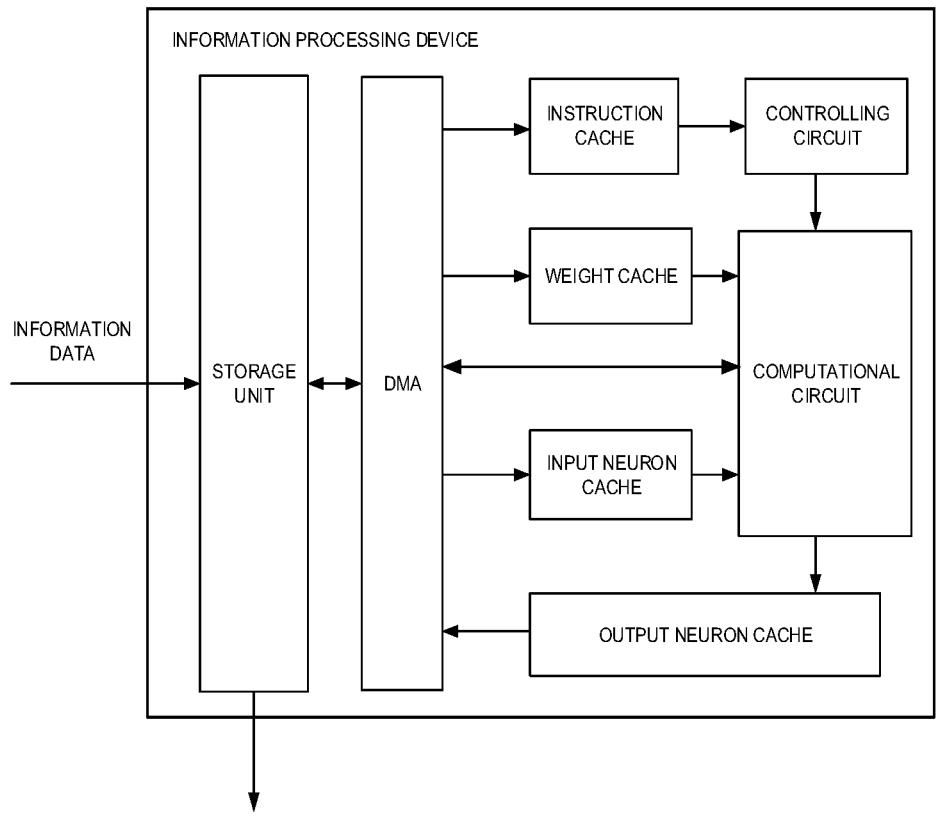
FIG. 2 is a block diagram of an information processing device according to another embodiment of the disclosure.

As illustrated in FIG. 2, the storage module may further include a storage unit, and the storage unit may be configured to acquire the information data from the outside of the information processing device and transmit it into the DMA for the computational circuit to call.

In some embodiments, as illustrated in FIG. 2, the storage module may be further configured to store a neural network dedicated instruction, and the information processing device may further include: an instruction cache configured to cache the dedicated instruction from the storage module for the controlling circuit to call.

In some embodiments, the storage module may be further configured to store input neurons, output neurons and weights in the neural network, and the information processing device may further include: an input neuron cache configured to cache the neurons from the storage module for the computational circuit to call; a weight cache configured to cache the weights from the storage module for the computational circuit to call; and an output neuron cache configured to store the output neurons obtained by the computation of the computational circuit.

In some embodiments, the computational circuit may be further configured to score the information data according to a judgment result of each key feature. In this scoring process, the output neurons corresponding to each key feature may be weighted and comprehensively scored.

In some embodiments, determining the predicted confidence corresponding to the key feature according to the information data in the computational circuit may include: performing neural network computation by taking the information data as input of the neural network, in which the predicted confidence may be taken as output of the neural network.

Figure 3:
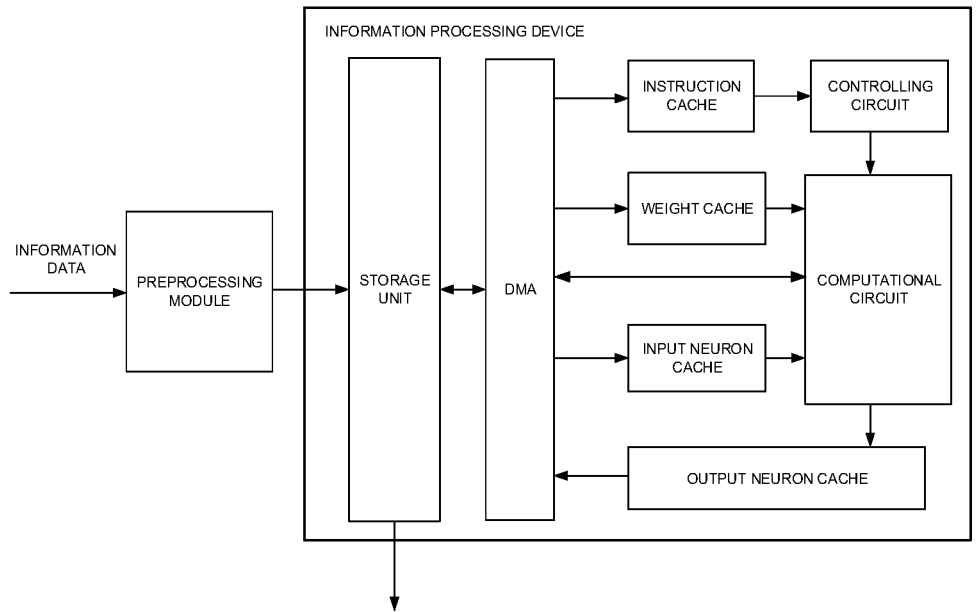
FIG. 3 is a block diagram of an information processing device according to yet another embodiment of the disclosure.

Referring to FIG. 3, in some embodiments, the information processing device may further include a preprocessing module configured to preprocess external original information data for transmission into the storage module. With configuration of the preprocessing module, on one hand, the input data may be more suitable to be processed by the artificial neural network to remove noise and redundancy in the input data and improve classification and recognition accuracy and the like; and on the other hand, subsequent space occupation in the storage module is reduced. Preferably, preprocessing may include original information data segmenting, Gaussian filtering, binarizing, regularizing and/or normalizing, and thus data consistent with an input data format of the neural network is obtained. Preferably, the input data format of the neural network may include, but is not limited to, an image size, a color mode, average brightness and/or a data size.

In some embodiments, the computational circuit may be further configured to perform adaptive training on the neural network. The computed predicted confidence may be compared with the known true confidence to adaptively update parameters (for example, the weights and an offset) in the network to further improve the recognition and prediction accuracy of the device. Preferably, an adaptive training process is implemented off line.

In some embodiments, the information processing device of the disclosure may be an integrated chip integrating each unit, module and circuit it may include, and may be preferably an artificial neural network chip capable of implementing the neural network computation.

Figure 4:
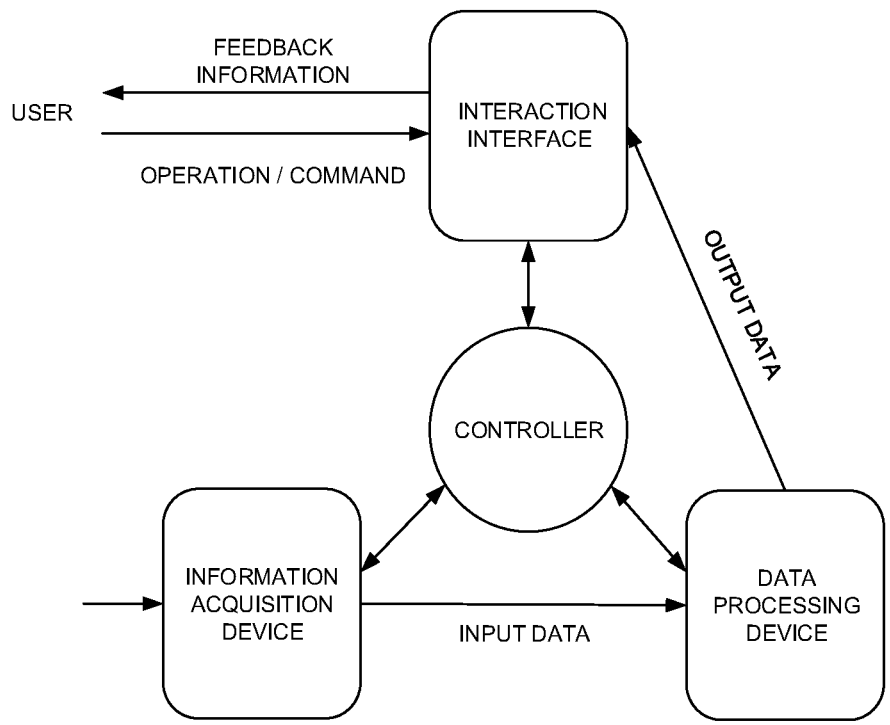
FIG. 4 is a block diagram of information processing equipment according to an embodiment of the disclosure.

Referring to FIG. 4, according to another aspect of the disclosure, information processing equipment is provided, which may include an information acquisition device configured to acquire external information data; and the processing device of the abovementioned embodiment may be configured to process the information data, obtain predicted confidence of a key feature, and modify the key feature or send out a modification signal if the predicted confidence exceeds a preset threshold value of true confidence.

Referring to FIG. 4, according to another aspect of the disclosure, information processing equipment is provided, which may include an information acquisition device configured to acquire external information data; the processing device of the abovementioned embodiment may be configured to process the information data, obtain predicted confidence of a key feature, and modify the key feature or send out a modification signal if the predicted confidence exceeds a preset threshold value of true confidence; and an interaction interface may be configured to receive the modified key feature or the modification signal and display a modified content to a user.

In the embodiment of the information processing equipment, the information acquisition device may be a camera, video camera, scanner and the like only with a photographic function, and may also be terminal equipment (for example, a mobile phone, a computer or wearable equipment) integrating the information acquisition device and the interaction interface.

In the embodiment, the interaction interface may include a display screen, a touch display screen and/or a data output interface. The interaction interface may receive the data (for example, including the modified key feature) of the information acquisition device or may receive original information data and modification signal of the information acquisition device, modify (including, but not limited to, scrawling, modification mark addition, video addition, local picture addition, text addition and voice addition) the original information data (for example, a picture) under control of a controller and display the original information data modified in a visible and audible manner.

In some embodiments, an interaction device may further include a preprocessing device configured to preprocess the information data acquired by the information acquisition device and send the information data preprocessed to the information processing device. A function realized by the preprocessing device is similar to that of the abovementioned preprocessing module, may refer to the abovementioned embodiment and will not be elaborated herein.

In some embodiments, the information processing equipment may further include the controller configured to control the information acquisition device, the information processing device and/or the interaction interface. Specifically, the information acquisition device may be controlled by the controller to acquire the original information data from the outside, the information processing device may be controlled by the controller to receive and process the information data and may perform an operation of judgment, modification or sending out the modification signal, and the interaction interface may be controlled by the controller to display the modified content and the like.

In some embodiments, the interaction interface may be further configured to modify the set threshold value in response to an operation or command of the user. For example, if the user regulates a threshold value corresponding to predetermined confidence of a specific key feature (for example, a specific text, a certain segment of voice or a certain segment of video), the operations of the information acquisition device may be performed through a touch screen, a mouse, a voice command, a keyboard or the like.

Figure 5:
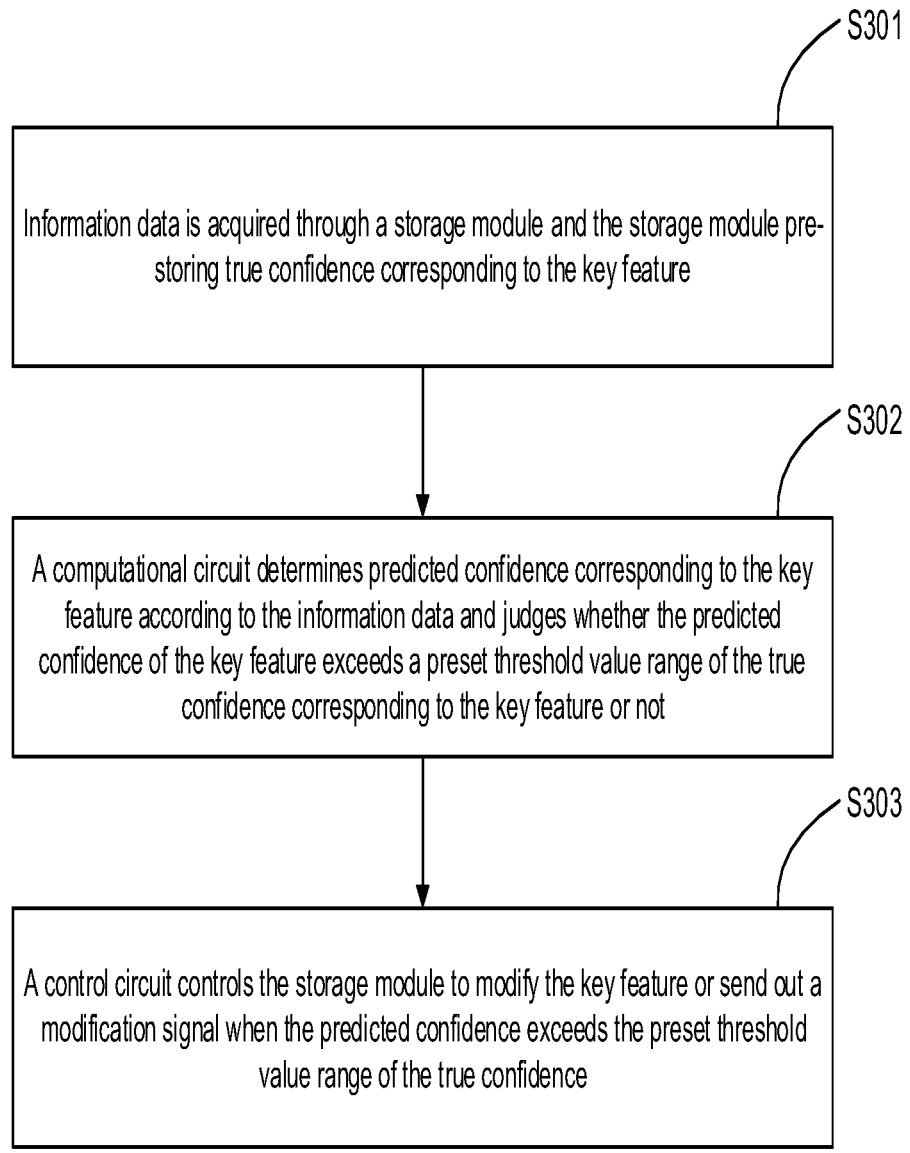
FIG. 5 is a flowchart of an information processing method according to an embodiment of the disclosure.

As illustrated in FIG. 5, another aspect of the embodiments of the disclosure further provides an information processing method, which may include the following steps.

In S301, information data is acquired through a storage module, the information data including at least one key feature and the storage module pre-storing true confidence corresponding to the key feature.

In S302, a computational circuit determines predicted confidence corresponding to the key feature according to the information data and judges whether the predicted confidence of the key feature exceeds a preset threshold value range of the true confidence corresponding to the key feature or not.

In S303, a controlling circuit controls the storage module to modify the key feature or send out a modification signal if the predicted confidence exceeds the preset threshold value range of the true confidence.

The processing method may correspond to the execution steps of the abovementioned processing device. A specific execution manner may refer to the descriptions about the abovementioned steps and will not be elaborated herein.

For further describing the disclosure, specific embodiments will be listed below for detailed description. In the following detailed descriptions, for convenient explanation, many specific details are elaborated to provide a comprehensive understanding to the embodiments of the disclosure. However, it is apparent that one or more embodiments may also be implemented without these specific details. Under another condition, a well-known structure and device are embodied in a graphical representation manner to simplify the drawings. It should be understood that the following detailed descriptions are not intended to limit the disclosure and, instead, they provide bases for those skilled in the art to understand alternative forms, equivalents and corrected cases covered by the embodiments described within the scope of the appended claims.

Embodiment 3 corresponds to a processing device for information data which is a picture, embodiment 4 corresponds to a processing device for information data which is an audio and/or a video, and embodiment 5 corresponds to information processing equipment.

Embodiment 3

In the embodiment, a storage unit of an information processing device may receive information data. The information data may include, but are not limited to, a group of pictures including one or more key features. The device computes confidence of each key feature included in the information data and obtains a judgment result. The device scores the information data in the storage unit according to the judgment result, where the information data may be original information data and may also be a result obtained by preprocessing the original data.

The information processing device may perform adaptive training. For example, the device inputs a group of pictures including one or more key features, such as a picture including a handwritten text and a picture forming a video. Each key feature has corresponding confidence, and the confidence is a natural number. For the input pictures for adaptive training, confidence of each key feature therein is known and is for example, true confidence. The device takes these pictures as information data and computes confidence, in other words predicted confidence, of each key feature. The computed predicted confidence is compared with the known true confidence to adaptively update parameters (for example, weights and an offset) in a network to further improve recognition and prediction accuracy of the device.

The confidence may be any natural number. For example, if a value of the confidence is larger, the confidence about inclusion of the key feature is higher. The confidence may also be normalized into a natural number within a certain range. For example, if the confidence is within [0, 1], the confidence represents a confidence probability about inclusion of the key feature.

A value of the true confidence of a training set is alternative, for example, {0, 1}, where 0 represents that the input picture does not include the corresponding key feature, and 1 represents inclusion of the feature; and of course, 1 may also represent exclusion and 1 may represent inclusion.

The abovementioned adaptive training process may be implemented off line. Here, the information processing device may be an artificial neural network chip, including a storage unit configured to store data and an instruction, where the data may include input neurons, output neurons, weights, a score, an error mode judgment result and the like, and a computational circuit configured to perform corresponding computation on the data according to the instruction stored in the storage unit. The computational circuit may mainly perform the computation in three steps. In a first step, the input neurons and weight data are multiplied. In a second step, adder tree computation may be performed to add a result obtained in the first step through an adder tree step by step to obtain a weighted sum, and the weighted sum is offset or not processed according to a requirement. In a third step, activation function computation may be performed on a result obtained in the second step to obtain the output neurons.

The information processing device may further include a DMA configured to read/write the data or instruction in the storage unit, an instruction cache, a weight cache, an input neuron cache and an output neuron cache.

In the information processing device, a controlling circuit may be configured to read a dedicated instruction from the instruction cache, decode it into an instruction for the computational circuit and input it into the computational circuit. The instruction cache may be configured to store the dedicated instruction. The weight instruction may be configured to cache the weight data. The input neuron cache may be configured to cache the input neurons input into a mapping unit. The output neuron cache may be configured to cache the output neurons (the confidence corresponding to each key feature) output by the computational circuit.

A direct data path between the DMA and the computational circuit may be configured to directly perform computation on the data stored in the DMA and return a result.

Preferably, the chip may further include a preprocessing module. The module preprocesses the original information data, in other words one or more pictures including a handwritten text or figure, to obtain image data matched with a scale of a bottommost input layer of an artificial neural network used by the chip, where preprocessing may include segmentation, Gaussian filtering, binarization, regularization, normalization and the like.

Preferably, a method by which the artificial neural network chip obtains the judgment result may include the follows. Each output neuron of a final output layer of the neural network corresponds to a keyword and a value of the output neuron is confidence of appearance of the keyword.

A modification method may include the follows. A standard answer is split into a set of multiple standard key features, which may be part of a letter, a word, a phrase (text data input) or a picture (image data input), and a standard correct mode of each key feature is pre-stored in the storage unit of the chip. Each output neuron of the final output layer of the neural network provides confidence of each key feature part and the corresponding standard correct mode. (If a certain error mode appears or confidence of its appearance is higher than a preset threshold value, the error mode is modified into the corresponding key feature in the standard answer.) The result of the output neuron is stored in the DMA and is retransmitted into the computational circuit for confidence modification threshold value comparison, and if the confidence of the key feature is lower than the preset threshold value, the key feature is modified according to the standard correct mode of the key feature.

The abovementioned judgment result obtaining, scoring and modification processes are all completed in the artificial neural network chip.

In step 1, the information data is transmitted into the storage unit through the preprocessing module or directly.

In step 2, the DMA transmits the information data in batches to the corresponding on-chip caches (in other words the instruction cache, the input neuron cache and the weight cache).

In step 3, the controlling circuit reads the instruction from the instruction cache and decodes and transmits the instruction into the computational circuit.

In step 4, the computational circuit may perform corresponding computation according to the instruction. In each layer of the neural network, computation is implemented mainly in three steps. In step 4.1, the corresponding input neurons and weights are multiplied. In step 4.2, adder tree computation may be performed, in other words, a result obtained in step 4.1 is added through an adder tree step by step to obtain a weighted sum, and the weighted sum is offset or not processed according to a requirement. In step 4.3, activation function computation may be performed on a result obtained in step 4.2 to obtain the output neurons, and the output neurons are transmitted into the output neuron cache.

In step 5, step 2 to step 4 are repeated until computation for all the data is completed, for example, obtaining a final result required by a function, where the final result is obtained by the output neurons of the final layer of the neural network, output from the computational circuit to the output neuron cache and temporally stored in the DMA for next computation.

In step 6, a scoring result, in other words the confidence of each key feature, stored in the output neurons of the neural network in the DMA is directly input into a computation device for comparison with the preset threshold value through a data path between the DMA and the computation device. If the confidence of the key features is lower than the preset threshold value, the input key features in the DMA are replaced with the standard correct modes of the corresponding key features. After all the key features are compared and replaced according to the abovementioned steps, modification work for the information data is completed in the DMA.

In step 7, the modified information data in the DMA is stored back into the storage unit and output as finally modified output data.

According to the requirement of the function, if the judgment result is required to be obtained, values of the output neurons of the final layer of the neural network are the confidence of appearance of the keywords; and if modification is required, the modified data finally subjected to step 7 in the storage unit is the finally modified data.

According to the requirement of the function, the structure may realize scoring and/or modification functions, and scoring result output is the output after steps 1-5 are performed; and modified output is the final output of the storage unit after steps 1-7 are completely performed.

Embodiment 4

A storage unit in an artificial neural network chip (corresponding to an information processing device) provided by the embodiment may be configured to pre-store one or more key frame pictures (corresponding to key features). The storage unit acquires a video from the outside and transmits the video into a computational circuit, where the video may include multiple input pictures. The computational circuit computes a similarity between each input picture and each key frame picture (to be specific, if there are N input pictures and M key pictures, NM similarities are obtained) and/or may perform normalized modification on the video.

Furthermore, the video may further include an audio which is divided into multiple segments of audios, and the multiple segments of audios correspond to the multiple pictures. The chip may perform comparison to obtain similarities between all the pictures in the video and each key frame picture, and/or may perform comparison to obtain similarities between each waveform obtained by decomposing all the audios in the video and key waveforms, and may perform normalized modification on the video.

Furthermore, the video is a movement video of one or more testees. Furthermore, the movement video may include the video of dancing, Wushu movements, or class-break setting-up exercises, movements and/or postures of a sports event, handwriting movements and/or postures, typing movements and/or postures and reading movements and/or postures.

A method for obtaining the similarities may be as follows. Each output neuron of a final output layer of a neural network corresponds to a similarity, and a value of the output neuron is a similarity value. (To be kept consistent with the above example, the layer has total N output neurons.)

Another method for obtaining the similarities may be as follows. Each output neuron of the final output layer of the neural network corresponds to an input picture, and the value of the output neuron is the similarity of the key frame picture most similar to the input picture and the input picture. (To be kept consistent with the above example, the layer has total N output neurons.)

Another method for obtaining the similarities may be as follows. Each output neuron of the final output layer of the neural network corresponds to a key picture, and the value of the output neuron is the similarity of the input picture most similar to the key frame picture and the key picture. (To be kept consistent with the above example, the layer has total M output neurons.)

A scoring method may be as follows. A layer is added after the final output layer of the neural network as a new final output layer, and output neurons in the previous final output layer are taken as input neurons of the layer added; the layer added has only one output neuron, and its value is a score; and weights in the layer added correspond to importance degrees of each similarity.

A modification method may be as follows. A similarity computation result obtained above is directly input into the computational circuit from the DMA and is compared with a preset threshold value. If the similarity is lower than the preset threshold value, it is determined that the corresponding key feature (which may be expressed as the corresponding key frame picture of the video) is inconsistent with a normalized standard and is required to be modified. Therefore, the corresponding input picture is replaced with the corresponding standard key frame picture for writing back into the DMA and final output into the storage unit for output.

Continuous data input such as a video and an audio is decomposed into multiple key frames according to the time. Similarities between the key frame pictures and standard key frame pictures are computed. If the similarities are lower than the preset threshold value, the input is modified by use of the standard pictures.

The abovementioned similarity obtaining and scoring processes are all completed in the artificial neural network chip, and may include the following steps.

In step 1, information data is transmitted into the storage unit through a preprocessing module or directly.

In step 2, the DMA transmits the information data in batches to corresponding on-chip caches (in other words an instruction cache, an input neuron cache and a weight cache).

In step 3, a controlling circuit reads an instruction from the instruction cache and decodes and transmits the instruction into the computational circuit.

In step 4, the computational circuit may perform corresponding computation according to the instruction. In each layer of the neural network, computation is implemented mainly in three steps. In step 4.1, the corresponding input neurons and weights are multiplied. In step 4.2, adder tree computation may be performed, in other words, a result obtained in step 4.1 is added through an adder tree step by step to obtain a weighted sum, and the weighted sum is offset or not processed according to a requirement. In step 4.3, activation function computation may be performed on a result obtained in step 4.2 to obtain the output neurons, and the output neurons are transmitted into the output neuron cache.

In step 5, step 2 to step 4 are repeated until computation for all the data is completed, for example, obtaining a final result required by a function, wherein the final result is obtained by the output neurons of the final layer of the neural network, is output from the computational circuit to the output neuron cache and is written into the DMA for next operation.

In step 6, a similarity result, in other words a score of each key feature (key frame), stored in the output neurons of the neural network in the DMA is directly input into a computation device for comparison with the preset threshold value through a data path between the DMA and the computation device. If the confidence of the key features is lower than the preset threshold value, the input key features in the DMA are replaced with the corresponding standard key frames. After all the key features are compared and replaced according to the abovementioned steps, modification work for the information data is completed in the DMA.

In step 7, the modified information data in the DMA is stored back into the storage unit and output as finally modified output data.

According to the requirement of the function, if the judgment result is required to be obtained, values of the output neurons of the final layer of the neural network are the similarities (scores) between each key frame and the standard key frame; and if modification is required, the modified data finally subjected to step 7 in the storage unit is the finally modified data.

Embodiment 5

A device may include an information acquisition device, an information processing device (for example, an artificial neural network chip) (with a structure the same as embodiment 3), an interaction interface and a controlling circuit.

The information acquisition device (this device may be an extension of a preprocessing device and is equivalent to a combination of an interface and the preprocessing device) may be configured to receive external information, the information including a text, an image, an audio, a video and the like, and transmit original data or preprocessed data to the artificial neural network chip as information data.

The interaction interface may be configured to interact with a user, for example, receiving an operation or command of the user and transmitting it to the controlling circuit. The interaction interface may be further configured to receive output data of the artificial neural network chip and convert the output data into feedback information in a proper form for display to the user. The controlling circuit may receive the operation or command of the user and controls operations of the whole device.

The interaction interface may enable the user to freely modify the abovementioned preset threshold value to obtain modification results capable of achieving different effects, and is friendlier. Meanwhile, the interaction interface may also provide the feedback information for the user, for example, an alarm about an incorrect sitting posture and modification and correction of a manner of holding a pen.

Furthermore, the information acquisition device is an image acquisition device and a sound acquisition device.

The image acquisition device is a webcam. The sound acquisition device is a microphone. Furthermore, a terminal is a character recognition device, a mobile phone, a computer, a notebook computer and a tablet computer.

In the embodiments provided by the disclosure, it should be understood that the disclosed related equipment, devices and methods may be implemented in other manners. For example, the device embodiment described above is only schematic. For example, division of the parts or the modules is only logical function division and another division manner may be adopted during practical implementation. For example, multiple parts or modules may be combined or integrated into a system or some characteristics may be neglected or not performed.

Each functional part/unit/subunit/module/submodule/component in the disclosure may be hardware. For example, the hardware may be a circuit, including a digital circuit, an analogue circuit and the like. Physical implementation of a hardware structure may include, but is not limited to, a physical device, and the physical device may include, but is not limited to, a transistor, a memristor and the like. The calculating module in the calculation device may be any proper hardware processor, for example, a CPU, a GPU, a Field-Programmable Gate Array (FPGA), a Digital Signal Processor (DSP) and an ASIC. The storage unit may also be any proper magnetic storage medium or magneto-optical storage medium, for example, a Resistance Random Access Memory (RRAM), a DRAM, an SRAM, an Embedded DRAM (EDRAM), a High Bandwidth Memory (HBM) and a Hybrid Memory Cube (HMC).

The electronic equipment may include, but is not limited to, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance and/or medical equipment.

The transportation means may include an airplane, a ship and/or a vehicle; the household electrical appliance may include a television, an air conditioner, a microwave oven, a refrigerator, an electric rice cooker, a humidifier, a washing machine, an electric lamp, a gas cooker and a range hood; and the medical equipment may include a nuclear magnetic resonance spectrometer, a B-ultrasonic scanner and/or an electrocardiograph.

Each functional unit/module/submodule/subunit in the disclosure may be hardware. For example, the hardware may be a circuit, including a digital circuit, an analogue circuit and the like. Physical implementation of a hardware structure may include, but is not limited to, a physical device, and the physical device may include, but not limited to, a transistor, a memristor and the like. The calculating module in the calculation device may be any proper hardware processor, for example, a CPU, a GPU, an FPGA, a DSP and an ASIC. The storage unit may also be any proper magnetic storage medium or magneto-optical storage medium, for example, an RRAM, a DRAM, an SRAM, an EDRAM, an HBM and an HMC.

Those skilled in the art may clearly know that, for convenient and brief description, descriptions are only made with division of each of the abovementioned functional modules as an example and the abovementioned functions may be allocated to different functional modules for realization according to a requirement during a practical application, in other words, an internal structure of the device is divided into different functional modules to realize all or part of the functions described above.

The purposes, technical solutions and beneficial effects of the disclosure are further described above with the specific embodiments in detail. It should be understood that the above is only the specific embodiment of the disclosure and not intended to limit the disclosure. Any modifications, equivalent replacements, improvements and the like made within the spirit and principle of the disclosure shall fall within the scope of protection of the disclosure.

What is claimed:

1. An information processing equipment, comprising
   an information acquisition device configured to acquire information data;
   an information processing device that includes:
      a storage module configured to:
         acquire the information data that includes at least one key feature, and
         store at least one true confidence corresponding to the at least one key feature;
      an operational circuit configured to:
         determine a predicted confidence corresponding to the key feature according to the acquired information data and
         determine whether the predicted confidence of the key feature exceeds a preset threshold value range of the true confidence corresponding to the key feature; and
      a controlling circuit configured to control the storage module to modify the key feature based on a determination that the predicted confidence exceeds the preset threshold value of the true confidence,
      wherein the information processing device is configured to process the information data, obtain the predicted confidence of a key feature, and modify the key feature or send out a modification signal when the predicted confidence exceeds a preset threshold value of true confidence; and
   an interaction interface configured to receive the modified key feature or the modification signal and display a modified content to a user,
   wherein the information acquisition device further includes a preprocessing module configured to preprocess the information data acquired by the information acquisition device and send it to the information processing device,
   wherein the information processing equipment further comprises a controller configured to control the information acquisition device, the information processing device, and/or the interaction interface, and
   wherein the interaction interface is further configured to modify the preset threshold value in response to an operation or command of the user.

2. The information processing device of claim 1,
   wherein the storage module includes a DMA (Direct Memory Access) electrically connected with the operational circuit and configured to:
      store the predicted confidence determined by operation of the operational circuit, and
      send the true confidence and the predicted confidence into the operational circuit for comparison, and
   wherein the storage module further includes a storage unit configured to:
      acquire the information data from the outside of the information processing device, and
      transmit it into the DMA for the operational circuit to call.

3. The information processing device of claim 1,
wherein the storage module is further configured to store a neural network dedicated instruction, input neurons, output neurons, and weights in a neural network, and
wherein the information processing device further includes:
an instruction cache configured to cache the dedicated instruction from the storage module for the controlling circuit to call,
an input neuron cache configured to cache the neurons from the storage module for the operational circuit to call,
a weight cache configured to cache the weights from the storage module for the operational circuit to call, and
an output neuron cache configured to store the output neurons obtained by the operation of the operational circuit.

4. The information processing device of claim 1, wherein the operational circuit is further configured to score the information data according to a judgment result of each key feature.

5. The information processing device of claim 1, wherein the operational circuit is further configured to
input the information data to a neural network, and
identify output of the neural network as the predicted confidence.

6. The information processing device of claim 1, further comprising a preprocessing module configured to perform one or more preprocessing operations external original information data and transmit into the storage module, wherein the preprocessing operations include original information data segmenting, Gaussian filtering, binarizing, regularizing and/or normalizing to obtained data consistent with an input format of a neural network.

7. An information processing method, comprising
acquiring, by an information acquisition device, information data
acquiring information data through a storage module of an information processing device, wherein the information data comprises at least one key feature;
storing, by the storage module, at least one true confidence corresponding to the at least one key feature;
determining, by an operational circuit, a predicted confidence corresponding to one of the at least one key feature according to the information data;
determining whether the predicted confidence of the key feature exceeds a preset threshold value range of the true confidence corresponding to the key feature;
controlling, by a controlling circuit, the storage module to modify the key feature based on a determination that the predicted confidence exceeds the preset threshold value range of the true confidence;
processing, by the information processing device, the information data;
obtaining, by the information processing device, the predicted confidence of a key feature,
modifying, by the information processing device, the key feature or sending out a modification signal when the predicted confidence exceeds a preset threshold value of true confidence;
receiving, by an interaction interface, the modified key feature or the modification signal and display a modified content to a user,
wherein the information acquisition device further includes a preprocessing module configured to preprocess the information data acquired by the information acquisition device and send it to the information processing device,
wherein the information processing equipment further comprises a controller configured to control the information acquisition device, the information processing device, and/or the interaction interface, and
wherein the interaction interface is further configured to modify the preset threshold value in response to an operation or command of the user.

8. The information processing method of claim 7, further comprises:
storing, by a DMA, the predicted confidence determined by the operational circuit;
sending, by the DMA, the true confidence and the predicted confidence into the operational circuit for comparison;
acquiring, by a storage unit, the information data from an external device; and
transmitting the information data into the DMA for the operational circuit to call.

9. The information processing method of claim 7, further comprising:
storing, by the storage module, a neural network dedicated instruction,
caching the neural network dedicated instruction in an instruction cache from the storage module for the controlling circuit to call,
storing, by the storage module, input neurons, output neurons and weights in a neural network,
caching, by an input neuron cache, the neurons from the storage module for the operational circuit to call,
caching, by a weight cache, the weights from the storage module for the operational circuit to call, and
storing, by an output neuron cache, the output neurons obtained by an operation of the operational circuit.

10. The information processing method of claim 7, further comprising:
adopting the operational circuit to score the information data according to a judgment result of each key feature.

11. The information processing method of claim 7, further comprising performing an adaptive training on a neural network through the operational circuit.

12. The information processing method of claim 7, wherein by the operational circuit, determining predicted confidence corresponding to the key feature according to the information data includes:
performing neural network operations by inputting the information data to a neural network, and identifying output of the neural network as the predicted confidence.

* * * * *